C. D. RYDER & R. B. KERSEY.
AUTOMATIC CURRENT REGULATOR FOR SEAM WELDING MACHINES.
APPLICATION FILED OCT. 24, 1918.
1,292,888.
Patented Jan. 28, 1919.
2 SHEETS—SHEET 2.
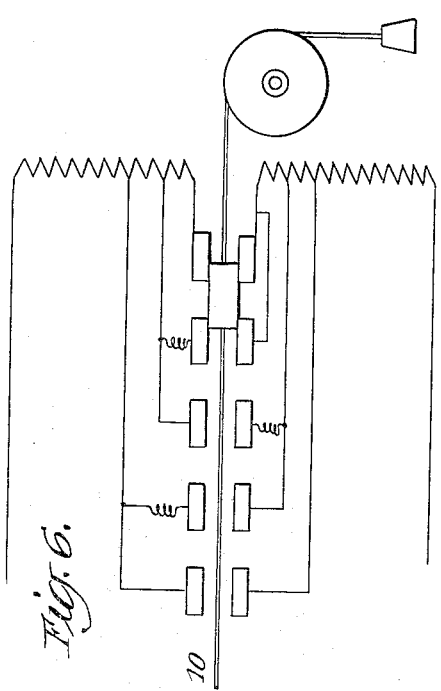
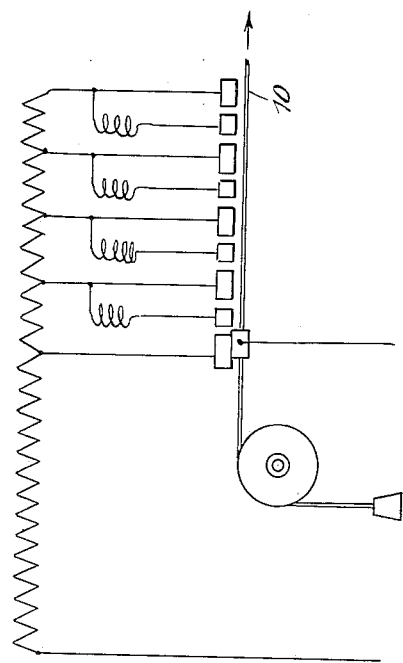
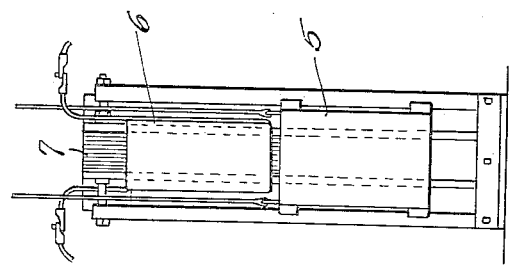
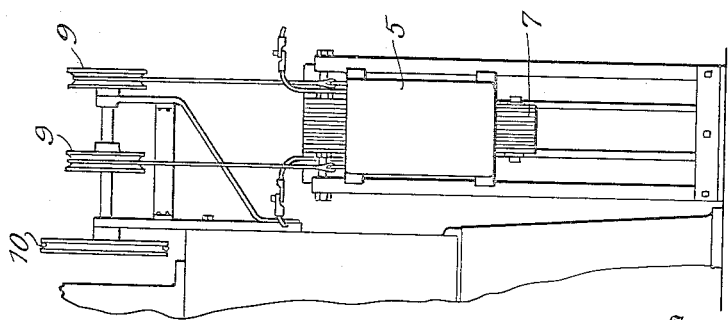
Inventor
Charles Daniel Ryder,
Ralph Blaine Kersey
By their Attorneys
Townsend Decker

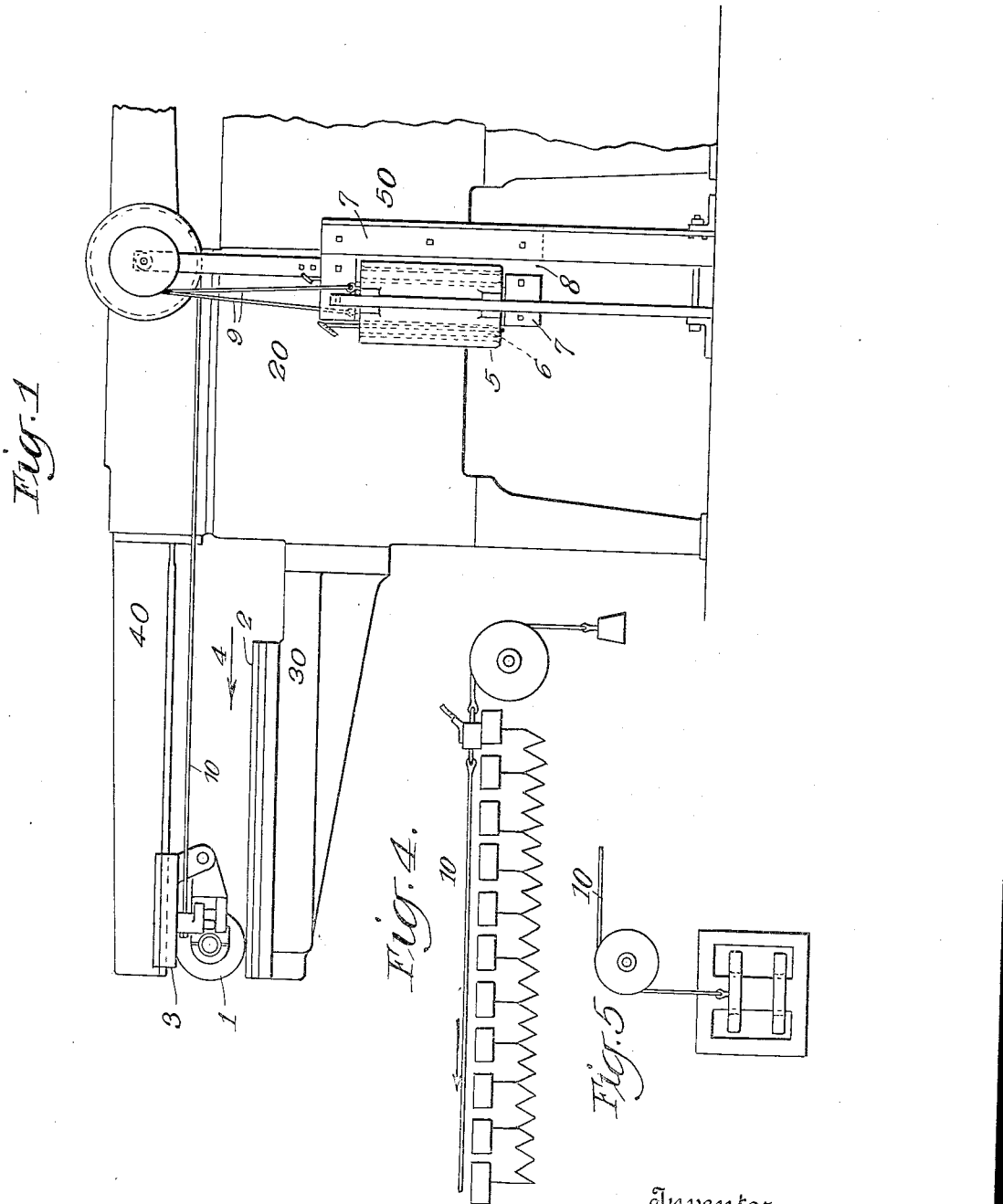

UNITED STATES PATENT OFFICE.

CHARLES DANIEL RYDER, OF COVINGTON, KENTUCKY, AND RALPH BLAINE KERSEY, OF CINCINNATI, OHIO, ASSIGNORS TO THOMSON ELECTRIC WELDING COMPANY, OF LYNN, MASSACHUSETTS, A CORPORATION OF MASSACHUSETTS.

AUTOMATIC CURRENT-REGULATOR FOR SEAM-WELDING MACHINES.

1,292,888.       Specification of Letters Patent.     Patented Jan. 28, 1919.

Application filed October 24, 1918. Serial No. 259,495.

*To all whom it may concern:*

Be it known that we, CHARLES DANIEL RYDER and RALPH BLAINE KERSEY, citizens of the United States, and residents of Covington, county of Kenton, and State of Kentucky, and Cincinnati, county of Hamilton, and State of Ohio, respectively, have invented certain new and useful Improvements in Automatic Current-Regulators for Seam-Welding Machines, of which the following is a specification.

Our invention relates to that class of electric seam welding apparatus in which, by reason of the construction or manner of operation, the progress of the operation of forming the seam is accompanied by a tendency to variation (either a lessening or an increase) in the strength of the welding current as the seam lengthens in the progress of the operation. Such variation in the strength of current may arise either from a change in the length of the welding current's circuit with consequent change in ohmic resistance and self-induction or from a change in reaction due to a change in the amount of work material in the work gap or from a combination of any two or more of said influences according to the construction of the apparatus. It may likewise occur in apparatus in which the work moves under stationary electrodes as well as in apparatus wherein the work is located on a stationary mandrel or bed and the welding electrode travels.

The object of our invention is to avoid any substantial variation of the welding current in apparatus of the above character due to the causes stated and to secure a substantial uniformity of welding current at all stages of the operation, thereby making it possible to produce a seam weld substantially uniform in character throughout its length.

To this end the invention consists in the combination with a seam welding apparatus of the character stated of suitable adjustable means for regulating the strength of the current and means for operating the adjustable element thereof automatically and progressively in accordance with the lengthening of the seam to keep the welding current constant in all stages of the formation of the seam.

In the preferred form of the invention the said adjustable element is mechanically connected to an element of the apparatus which moves progressively in the forming of the seam but other means for operating said adjustable element might be employed without departing from our invention in its broader sense. For the sake of illustration, however, the invention will be described as applied in connection with a seam welding apparatus in which the welding electrode moves in forming the seam and in which furthermore the work is located in a throat or space forming a work gap between two arms carrying the welding current, so that as the seam lengthens the reaction to the flow of welding current due to the presence of the work, varies with the progress of the operation.

Our invention is obviously applicable to seam welding apparatus in which the welding electrode is a roller electrode as well as to those in which the electrode is a spot welding electrode.

The invention also consists in certain features of construction of the welding apparatus as more particularly hereinafter described and claimed.

In the accompanying drawings:

Figure 1 is a side elevation of one form of an apparatus embodying our invention.

Fig. 2 is an elevation showing the current regulator forming a part of the apparatus Fig. 1, the adjustable element being indicated in one of its extreme positions.

Fig. 3 shows the same device in its other extreme position.

Fig. 4 shows a current regulator adapted to act by variation of ohmic resistance.

Figs. 5, 6 and 7 show other variations of the means that might be used under the control of the seam welder as a current regulator for the purposes of our invention.

The transformer which furnishes current through its secondary winding to the work to be welded is contained within the pedestal 20 of the machine and one terminal of the transformer is connected to the bronze or copper horn 30. The other terminal of the transformer is connected to the copper horn 40. 2 is a die made of copper and held firmly by means of suitable clamping device in the copper horn 30. 1 is a roll carried by sliding part 3, said sliding part 3 being movable in a horizontal direction on the copper horn 40 and making electrical contact therewith by means of suitable strong tension parts.

The stock to be welded is placed over the die 2 in such a way that two edges of the stock of sheet metal overlap for a short distance. The roller or sliding die or electrode 1 is caused to move directly on the overlapping edge, and tension is applied so as to insure continuity of the circuit from 40 through the slide 3, roll die, the lapping stock, the die 2, and horn 30, the circuit being completed through the secondary winding of the transformer.

The direction of travel of the roll is indicated by arrow 4. It is easily conceivable that, unless special means are provided, as the roll moves from the back end of its stroke near 4, to the forward end in which position the electrode is shown, that the welding current will drop appreciably, and in proportion to the ohmic resistance of the lengthening circuit and to the self-induction of same, or to the increasing reaction due to the inclusion of a progressively increasing amount of material in the work gap as the seam lengthens in the progress of the work.

In order to overcome this defect we employ a current regulator which is automatically adjusted by the action of the moving element 1 to regulate the current for each position of the electrode or element 1 and so that the welding current will be practically uniform throughout the stroke or movement taking place in the formation of the complete seam. Any form of device suitable for producing such regulating action may be employed and associated with the apparatus in any suitable way to determine the strength of the welding current. Thus for instance a variable reactance or resistance to the flow of the primary current in the transformer may be employed to vary the current flow in the secondary or welding circuit. In the drawing we show a reactance employed for this purpose and which is automatically adjusted to interpose in the primary circuit of the transformer the proper reactance for each position of the roller, so that when the roller is in a forward position, as shown, a minimum of reactance is interposed, while at the beginning of the stroke a maximum effect is secured. The reactor is so designed and wound that the effect throughout the stroke will be practically uniform.

In this reactor 5 is a cast copper sleeve or tube which, in the position shown, encircles coil 6 wound upon one leg of the laminated sheet iron core 7. The primary winding 6 of this reactor is connected in series with the primary winding of the welder transformer.

The core 7 of this reactor forms a closed magnetic circuit except for the small air gap 8, which must necessarily be provided in order that the copper tube 5 may move downward and out of the magnetic circuit entirely when the roll die is returned to its original position near the Fig. 4.

To move or adjust the element 5 under the action or control of the seam welder or part thereof moving in accordance with the progress of the lengthening seam, suitable cables and pulleys 9 connected with the sliding carriage or element 3 by means of cable 10 may be employed.

In operation it will readily be seen that as the roll die moves forward over the work, the tube 5 is pulled upward into the iron core and gradually surrounds the winding 6. As the tube 5 encircles more and more of the winding 6 and comes more and more into the magnetic circuit, a gradually increasing current is induced in the upper tube. When the copper tube has reached its highest position, as shown, doing this simultaneously with the arrival of the roll at the forward end of its stroke, all the lines of force practically which are set up by the winding 6 encircle the copper tube 5, which acts as the short circuited secondary of a transformer, neutralizing the counter electromotive force set up within the coil 6.

Obviously other regulating means might be employed to insure constant value of the welding current under the same conditions as the above. Thus for instance a rheostat (Fig. 4) operating on the ohmic resistance of the primary might be used. Or as shown in Fig. 5, the relation of a transformer coil to the magnetic circuit or core might be varied to regulate the output by varying the magnetic leakage and thus regulate the current. Or as shown in Fig. 6, portions of the primary winding of the welding transformer might be cut out so that the secondary voltage would increase in proportion to increase of impedance in the welding circuit as the making of the seam progresses. As shown in Fig. 7 an auto transformer might be employed for generating the welding current and means provided for varying the secondary voltage thereof so as to secure the desired effect. Other means will readily occur to those skilled in the art as suitable for regulating the current in the welding circuit of the seam welder by adjustment of an element of the current regulator by the action of the seam welder according to the progress of the work.

What we claim as our invention is:—

1. The combination with an electric seam welder of the character described, of means for automatically regulating the welding current progressively in accordance with the progressive lengthening of the seam to keep said welding current constant.

2. The combination with an electric seam welder of the character described, of means for regulating the flow of the welding current and means connected with a movable element of the welder for controlling the operation of the adjustable element of the regulating means to move the same progressively in accordance with the lengthening seam to keep said welding current constant.

3. The combination with an electric seam welding apparatus of the character described, of an adjustable current regulator and means connected with a movable element of the seam welder for controlling the action of the current regulator to keep the welding current constant as the seam lengthens.

4. In electric seam welding apparatus of the character described, the combination with a moving element thereof, of a current regulator having an adjustable element mechanically connected with said movable element whereby the welding current may be kept constant in the progress of forming the seam.

5. An electric seam welder having a pair of conducting arms providing a throat to receive the work, a sliding welding electrode sliding in connection with one of said arms, a current regulator and means connected with said welding electrode for adjusting the action of the current regulator to keep the current constant as the seam lengthens.

6. An electric seam welder having a pair of conducting arms providing a throat to receive the work, and a roller welding electrode in sliding connection with one of said arms, combined with an adjustable current regulator having its adjusting element connected with said electrode to move therewith in the sliding movement.

7. The combination with an electric seam welding machine having a pair of conducting arms providing a throat to receive the work, of a current regulator and means for automatically adjusting the action of the same in accordance with the progressively changing reaction of the work as the seam lengthens to keep the current constant.

Signed at Cincinnati, in the county of Hamilton and State of Ohio, this eighteenth day of October, A. D. 1918.

CHARLES DANIEL RYDER.
RALPH BLAINE KERSEY.

Witnesses:
L. G. PALMER,
W. J. OVERBECK,